UNITED STATES PATENT OFFICE.

FRANK S. WASHBURN, OF NASHVILLE, TENNESSEE.

PROCESS OF RENDERING CALCIUM CYANAMID NON-DUSTING.

1,098,651. Specification of Letters Patent. Patented June 2, 1914.

No Drawing. Original application filed June 3, 1912, Serial No. 701,380. Divided and this application filed October 3, 1912. Serial No. 723,794.

*To all whom it may concern:*

Be it known that I, FRANK S. WASHBURN, a citizen of the United States, residing at Nashville, in the county of Davidson and State of Tennessee, have invented certain new and useful Improvements in Processes of Rendering Calcium Cyanamid Non-Dusting; and I do hereby declare the following to be a full, clear, and exact description of the invention, such as will enable others skilled in the art to which it appertains to make and use the same.

This invention relates to a method of changing commercial calcium cyanamid from a fine dust into a granular condition, and has for its object to produce a product which while having all the present desirable properties of this compound, yet will not have the objectionable qualities that are now met with in handling and using said compound.

To these ends the invention consists in the novel steps constituting my process, all as will be more fully hereinafter disclosed and particularly pointed out in the claim.

This application is a division of Patent 1,049,953, dated January 7, 1913, and entitled Process of rendering calcium cyanamid non-dusting.

In order that my invention may be fully understood, the present objections that are met with in the handling and use of commercial calcium cyanamid are stated as follows:—Commercial calcium cyanamid, or lime nitrogen as it is commonly called, when made contains among other things about 25% of free calcium hydrate $Ca(OH)_2$, as well as some calcium oxid $CaO$, or caustic lime, and the physical condition of the mass is that of a very fine and almost impalpable powder. In use this powder, before it is sold to the farmers, is usually mixed with various materials generally consisting in part of phosphoric acid, in part of potash, and in part of nitrogenous matter. While carrying out this mixing process, it is found difficult to confine the very finely divided powder in ordinary mechanical mixers; and owing to its impalpable nature it is readily supported in the air and therefore fills the atmosphere with a penetrating dust which is exceedingly disagreeable to the workmen. It also enters the clothing and causes irritation to the skin. Again, owing to its great degree of fineness, a very large surface is exposed, and consequently it rapidly combines chemically with the free acid of the mixed phosphatic materials, gives rise to high temperatures and causes, to a greater or less extent, the phosphoric acid to change from a soluble to an insoluble form. Further, largely due to the relatively excessive surface exposed, in its finely subdivided condition, cyanamid when stored, takes up moisture, both free and combined, as well as carbon dioxid from the atmosphere, which results in an increased weight. This is a disadvantage in that the compounder may not be certain, under such circumstances, of the definite composition at any particular time of the cyanamid which he may desire to use. All these difficulties are due primarily to the presence of calcium hydrate and free lime in the commercial cyanamid, either existing originally as such in the material or resulting from the breaking down of the calcium cyanamid contained in the commercial product. But said difficulties are exaggerated to a degree to make them commercially objectionable by reason of the physical condition of the product as a fine powder.

Various attempts have been made in the past to overcome the unfavorable effects of free lime in lime-nitrogen. But all these attempts were along the line of neutralizing the free lime to form a neutral and stable salt of it, and in hydrating the free lime to lime hydrate, which did not change the lime-nitrogen into a granular condition. By my invention now to be described, however, all of these difficulties are overcome in a comparatively inexpensive and expeditious manner.

I form the commercial cyanamid of lime-nitrogen, into briquets preferably under a high pressure, and preferably with a small per cent. of water, whereupon a heavy compact flinty mass results. These briquets are then crushed to particles or granules of the required size, such for example, as will pass through a screen of eight meshes to the square inch, but not through a screen of fifteen meshes to the inch. The exposed surface area of the resulting granular product per unit of weight being enormously less than that of the powdered product and the moisture due to the added water serving to slake the lime, the above disadvantages are found to practically disappear.

In some cases, I prefer in order to attain an improved result to first mix with the lime nitrogen a nitrogenous waste, or other binder; to then briquet it, and to then crush it. The coarser particles from the crushers are returned and recrushed, while the undersized particles are returned to the briqueting machine.

It will be seen from the foregoing that the physical size of the granules of the cyanamid and therefore many of its chemical properties can be easily controlled to suit all the exacting conditions of use.

The resulting product produced by the steps above differs from the now well known commercial calcium cyanamid, or lime nitrogen, in that it is non-dusting; it contains very much less free caustic lime, or none at all; when compounded with phosphatic materials the mixture contains much less insoluble phosphoric acid than heretofore, or none at all; and when a binder is employed, it contains such binder which may also have a high fertilizer value in itself.

It is obvious that those skilled in the art may vary the steps above without departing from the spirit of my invention, and therefore I do not wish to be limited to this disclosure except as may be required by the claim.

What I claim is:—

The process of rendering commercial calcium cyanamid non-dusting which consists in adding water and a binder thereto, forming the same into briquets under pressure, crushing the briquets to the desired fineness, subjecting the crushed product to a screening action to insure the resulting granules being of a size passing through a screen of eight meshes to the square inch but not through a screen of fifteen meshes to the square inch, and finally recrushing those particles which are over size, and re-briqueting those particles which are under size, substantially as described.

In testimony whereof, I affix my signature, in presence of two witnesses.

FRANK S. WASHBURN.

Witnesses:
   H. A. BLACK,
   A. D. WHITTEMORE.